United States Patent Office 3,512,941
Patented May 19, 1970

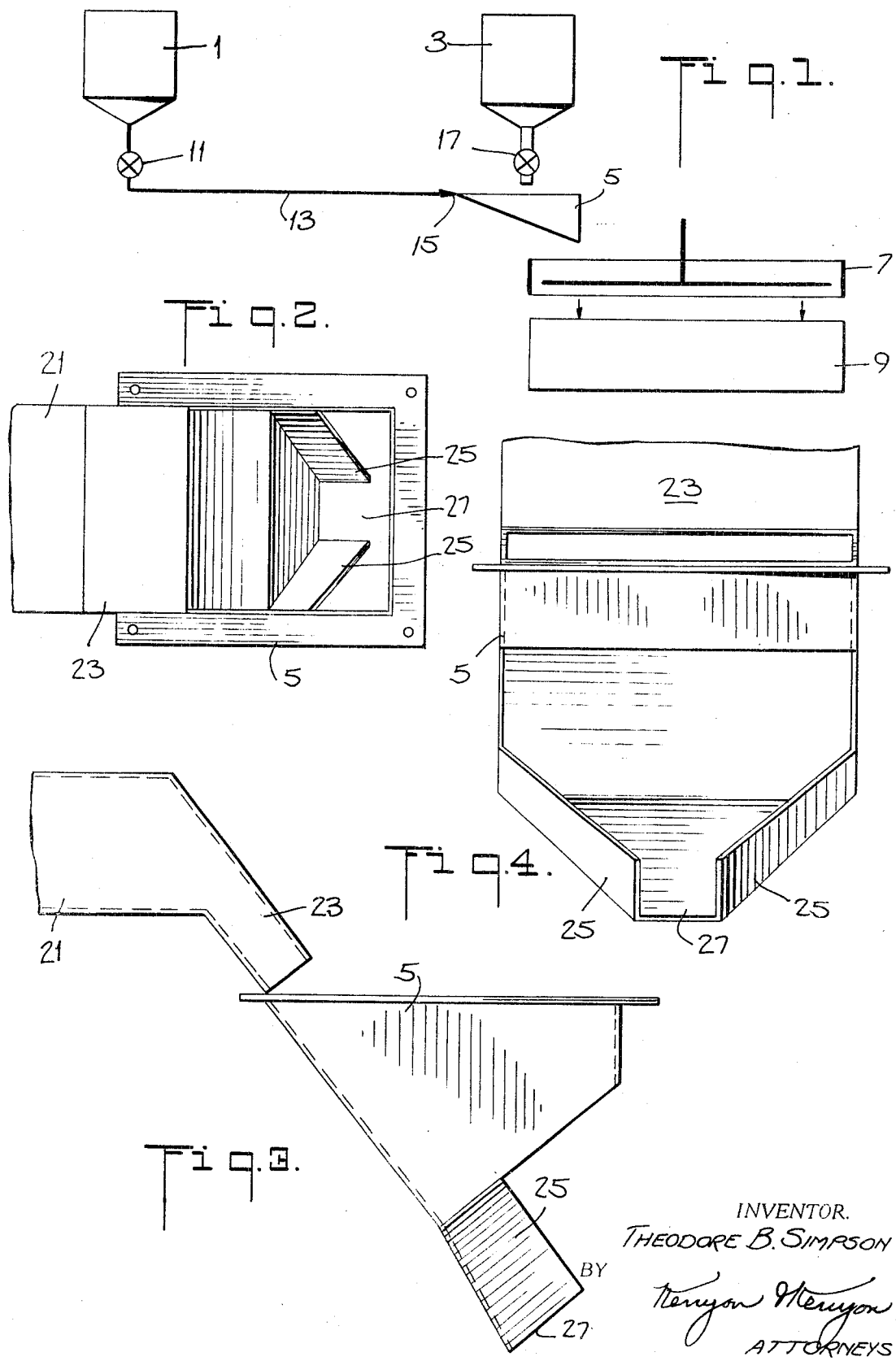

3,512,941
APPARATUS FOR PRODUCING NORMAL SUPERPHOSPHATE
Theodore B. Simpson, New Bern, N.C., assignor to Texas Gulf Sulphur Company, New York, N.Y., a corporation of Texas
Filed Nov. 16, 1967, Ser. No. 683,551
Int. Cl. C05b 1/10
U.S. Cl. 23—259.2                    8 Claims

ABSTRACT OF THE DISCLOSURE

The den process for producing normal superphosphate is modified by premixing acid and phosphate rock by discharging rock onto a rectilinear, downwardly-flowing stream of acid flowing at an inclination to the horizontal prior to charging acid and rock to the pan mixer. The premixing improves the quality of the product by reducing the citrate insoluble content thereof and facilitates control of the process by minimizing reactions of explosive violence.

---

This invention is concerned with the production of normal superphosphate. More particularly, this invention relates to apparatus and processes for mixing phosphate rock and sulfuric acid to produce normal superphosphate.

Normal superphosphate is produced by mixing particulate phosphate rock with sulfuric acid and then allowing reaction to occur (curing) whereby normal superphosphate, usually containing from about 16 to about 22 percent $P_2O_5$, is obtained. There are several techniques which are employed to produce normal superphosphate. One such technique comprises the den process, wherein mixing of acid (normally 50 to 57° Bé. acid) and phosphate rock (normally from about 50 percent to about 95 percent through 200 mesh) is effected in a vertical shaft, pan-type batch mixer and the resulting slurry is discharged into a den where reaction between acid and rock is completed in a batch-wise manner. The resulting product is then removed, cured and sold.

In batch operations of this type it has been found that product quality, as measured by the size of the citrate insoluble fraction in the product recovered from the den, is rather poor. The citrate insoluble fraction represents unreacted phosphate rock, and in many den type processes can be as high as 4 percent, and rarely is less than 1 percent. Not only is the citrate insoluble fraction quite high, it can vary widely from batch to batch.

The lack of product uniformity from batch to batch, and the generally high proportion of unreacted phosphate rock is believed due to inefficient mixing of acid and rock in the den process. As is well known, the initial acid-rock slurry is quite fluid, but as the reaction between acid and rock proceeds the slurry thickens quickly until a solid mass is obtained. In the conventional den process the acid and rock are concurrently charged directly to the pan mixer and, after a residence period of from about ½ to about 3 minutes, the resulting syrupy mixture is discharged to the den. The pan type mixers which are employed are generally inefficient in that, to permit adequate agitation of the thickened slurry, the mixer is so designed that there is poor agitation of the initial very fluid slurry. It is precisely during the period following the initial contact of acid and rock, however, that good agitation is desired to achieve complete and intimate mixing and, thus, a complete reaction.

In addition to the problem of achieving efficient mixing, a second problem is frequently encountered. When the acid and rock are combined a vigorous reaction occurs with the evolution of heat and the generation of gases. In some cases the reaction is sufficiently violent to cause the expulsion of gas and dust from the mixer, thereby presenting a safety hazard. This problem can be alleviated by reducing the size of the batch, but this expedient results in an inefficient utilization of the equipment.

It is an object of this invention to provide a means to ensure more efficient mixing of acid and phosphate rock for production of normal superphosphate by the den process.

It is another object of this invention to provide a means for reducing the citrate insoluble portion of normal superphosphate produced by the den process.

Still another object of this invention is the provision of a means for moderating the reaction of acid and phosphate rock upon mixing in the den process for producing normal superphosphate.

SUMMARY OF INVENTION

These and other objects of this invention, which will be apparent from the ensuing discussion, appended claims and accompanying drawings, are achieved by premixing the particulate phosphate rock and acid before charging to the pan mixer. Premixing is effected by depositing the particulate rock on the surface of a downwardly-flowing, rectlinear stream of acid, whereby mixing of the rock and acid occurs, and thereafter charging the mixture to a pan mixer, wherein the mixing process is completed. In a preferred embodiment the stream of acid and entrained rock is constricted after initial contact and prior to charging to the pan mixer, whereby extremely efficient premixing is achieved. By operating in this manner the natural turbulence of the flowing acid aids in mixing. Because acid and rock are combined in incremental amounts, heat buildup, and accordingly the danger of an explosive reaction, is minimized.

DRAWINGS

A preferred form of apparatus for use in accordance with this invention is shown in the drawings, of which:
 FIG. 1 is a schematic diagram of the apparatus;
 FIG. 2 is a plan view of the mixing chute employed in accordance with this invention;
 FIG. 3 is a side view of the chute of FIG. 2; and
 FIG. 4 is an end view of the chute.

DESCRIPTION OF INVENTION

With reference to FIG. 1, the apparatus comprises acid tank 1, phosphate rock hopper 3, mixing chute 5, pan mixer 7 and den 9. Acid is discharged from tank 1 at a selected rate determined by the setting of valve 11, and fed via line 13 to the lip of chute 5 and thence down the surface of chute 5. Particulate phosphate rock is discharged from hopper 3 at a controlled rate, as determined by valve 15, onto the surface of the acid flowing down chute 5. The resulting admixture is then charged to pan mixer 7 wherein mixing is completed, and the resulting slurry is discharged to den 9.

The conditions maintained in and the manner of operation of pan mixer 7 and den 9 are known to those of ordinary skill in the art, and accordingly will not be further discussed.

In a preferred embodiment, and with reference to FIGS. 2, 3 and 4, a uniform flow rate of acid is established across the entire width of chute 5. This is most readily accomplished by charging the acid to a substantially horizontal channel 21 to establish viscous flow towards discharge nozzle 23. Discharge nozzle 23 is equal in width to channel 21 and extends downwardly toward mixing chute 5. The floors of nozzle 23 and chute 5 are preferably coplanar. The angle of the floors of nozzle 23 and chute 5 is not narrowly critical, but an angle of from about 50° to about 70°, preferably about 60°, from the horizontal has been found useful.

In a preferred form, chute 5 is constricted, as by walls 25, to form a discharge spout 27 having a width which is desirably from about ¼ to ⅓ the width of the chute, and extends a distance approximating the original width of the chute. Although not essential, the angle of the floor of chute 5 may be further increased at the beginning of the constriction. This increase in slope, if employed, ordinarily is in the range of from about 5° to about 10°, and is preferably about 7½°.

The phosphate rock is discharged onto the surface of the flowing acid in chute 5. The area of contact can be anywhere on the surface of chute 5, but is desirably prior to the spout or constriction formed by walls 25.

The flow rates of acid and phosphate rock and the dimensions of chute 5 are such that premixing of the entire batch is effected within a period of from about 5 seconds to about 2 minutes, and preferably from about 10 seconds to about 1 minute. Periods of from about 20 to about 40 seconds are generally optimum.

The relative flow rates of acid and phosphate rock are adjusted to maintain the desired acidulation ratio. For example, if the weight ratio of acid to phosphate rock for the complete charge is 1.2:1, the acid and phosphate rock feed rates are 1.2 and 1 parts per unit time, respectively. In a preferred embodiment, the acid flow rate is desirably established prior to the rock flow rate, and is continued after completion of the phosphate rock discharge, resulting in a somewhat lower relative rate than would be obtained in the manner described above.

To illustrate the degree of improvement which may be obtained in accordance with this invention, a den process apparatus capable of handling a typical charge of 1000 pounds of rock and 900 pounds of 56 Bé. acid was modified by the inclusion of a mixing chute of the type shown in FIGS. 2–4. The acid channel 21 was 4 feet long, 10½" wide and 8" high, and had a nozzle portion at an angle of 60° having a floor length of 4½ inches. The chute was 17 inches wide and had a run of 13⅞ inches to the constricted portion, the floor of which was at an angle of 7½° to the floor of the chute. The constricted portion was 16 inches long and narrowed to a 5-inch wide opening. The feed rates of rock and acid were adjusted to maintain a 0.9:1 ratio and to complete premixing within about 30 seconds, the approximate time required to feed the pan mixer if rock and acid are directly charged thereto. Prior to installation of the premixer the product normal superphosphate recovered from the den and prior to curing from 5 successive batches averaged 20.04 percent total phosphoric acid ($P_2O_5$) (range=19.52 to 20.90) and 2.41 percent citrate insoluble fraction (range=1.27 to 3.19). After installation of the chute the respective values were 19.20 (range=18.82 to 19.99) and 0.45 (range=0.37 to 0.55). In addition to the reduction in the average amount of and variation in the citrate insoluble fraction, the product was grainier, less "ratty," less dense, and in general more uniform than the previously produced product. Not only was product quality improved, but there were significant processing advantages in that there was a significant reduction in gas (HF and $SiF_4$) and rock blowback from the mixer. Moreover, the more uniform product was thicker than that previously obtained, and could be easily handled on removal from the den without the need for the addition of excess phosphate rock to the mixer.

What is claimed is:

1. In an apparatus for producing normal superphosphate from sulfuric acid and phosphate rock comprising a pan mixer and a den having fluid communication therebetween, a pre-mixing device including downwardly inclined means for establishing a downward, rectilinear stream of a predetermined amount of said acid at a controlled rate and means for discharging a predetermined amount of particulate phosphate rock onto the surface of said stream at a controlled rate to form a mixture of acid and rock of selected proportions and means for conveying said mixture to said pan mixer.

2. Apparatus according to claim 1, including means for constricting said stream after discharge of said rock onto the surface thereof, whereby intimate mixing of said acid and said rock is obtained.

3. Apparatus according to claim 2 wherein said downwardly inclined means for establishing said stream comprises a chute at an angle of from about 50° to about 70° from the horizontal.

4. Apparatus according to claim 1 wherein said downwardly inclined means for establishing said acid stream is a chute and including a generally horizontal channel for feeding said acid in viscous flow to said chute.

5. Apparatus according to claim 4, including means for constricting said stream after discharge of said rock onto the surface thereof, whereby intimate mixing of said acid and said rock is obtained.

6. Apparatus according to claim 5 wherein said means for establishing said stream comprises a chute at an angle of from about 50° to about 70° from the horizontal.

7. Apparatus according to claim 6 wherein said means for constricting said stream has a floor having an increased angle from the horizontal, relative to said chute, of from about 5° to about 10°.

8. Apparatus according to claim 7 wherein the angle of said chute is about 60° and the angle of said constricting means, relative to said chute, is about 7½° in a direction away from the horizontal.

References Cited

UNITED STATES PATENTS

| | | | |
|---|---|---|---|
| 1,105,304 | 7/1914 | Reed | 23—109 |
| 1,982,479 | 11/1934 | Ober et al. | 23—259.2 |
| 2,722,472 | 11/1955 | Le Baron | 23—109 |
| 2,728,635 | 12/1955 | Miller | 23—109 |
| 3,023,089 | 2/1962 | Graves et al. | 23—259.2 |

MORRIS O. WOLK, Primary Examiner

B. S. RICHMAN, Assistant Examiner

U.S. Cl. X.R.

23—109, 259.3